US012002608B2

(12) United States Patent
Ye

(10) Patent No.: US 12,002,608 B2
(45) Date of Patent: Jun. 4, 2024

(54) FERROMAGNETIC POWDER COMPOSITION

(71) Applicant: Höganäs AB (Publ), Höganäs (SE)

(72) Inventor: Zhou Ye, Höganäs (SE)

(73) Assignee: HÖGANÄS AB (PUBL), Höganäs (SE)

( * ) Notice: Subject to any disclaimer, the term of this patent is extended or adjusted under 35 U.S.C. 154(b) by 230 days.

(21) Appl. No.: 17/058,942

(22) PCT Filed: May 28, 2019

(86) PCT No.: PCT/EP2019/063717

§ 371 (c)(1),
(2) Date: Nov. 25, 2020

(87) PCT Pub. No.: WO2019/229015

PCT Pub. Date: Dec. 5, 2019

(65) Prior Publication Data

US 2021/0210259 A1 Jul. 8, 2021

(30) Foreign Application Priority Data

May 30, 2018 (EP) .................................... 18175161

(51) Int. Cl.
*H01F 1/24* (2006.01)
*B22F 1/102* (2022.01)
(Continued)

(52) U.S. Cl.
CPC ................ *H01F 1/24* (2013.01); *B22F 1/102* (2022.01); *B22F 1/16* (2022.01); *H01F 1/1475* (2013.01);
(Continued)

(58) Field of Classification Search
CPC ...... H01F 1/14766; H01F 1/1475; H01F 3/08; H01F 27/24; H01F 27/255;
(Continued)

(56) References Cited

U.S. PATENT DOCUMENTS 5,063,011 A 11/1991 Rutz et al.
5,595,609 A 1/1997 Gay
(Continued)

FOREIGN PATENT DOCUMENTS

DE 3439397 A1 4/1986
EP 1246209 B1 10/2006
(Continued)

OTHER PUBLICATIONS

Poquillon et al., "Cold compaction of iron powders-relations between powder morphology and mechanical properties Part I: Powder preparation and compaction", Powder Technology 126, 2002, pp. 65-74 (Year: 2002).*
(Continued)

*Primary Examiner* — Adil A. Siddiqui
(74) *Attorney, Agent, or Firm* — Boone IP Law

(57) ABSTRACT

The present invention relates to an electrically insulated iron-based soft magnetic powder composition, a soft magnetic composite component obtainable from the powder composition and a process for producing the same. Specifically, the invention concerns a soft magnetic powder composition for the preparation of soft magnetic components working at high frequencies, the components being suitable for use e.g. as inductors or reactors for power electronics.

15 Claims, 5 Drawing Sheets

(51) Int. Cl.

| | |
|---|---|
| ***B22F 1/16*** | (2022.01) |
| ***H01F 1/147*** | (2006.01) |
| ***H01F 3/08*** | (2006.01) |
| ***H01F 27/24*** | (2006.01) |
| ***H01F 27/255*** | (2006.01) |

(52) U.S. Cl.
CPC ........... *H01F 1/14766* (2013.01); *H01F 3/08* (2013.01); *H01F 27/24* (2013.01); *H01F 27/255* (2013.01)

(58) Field of Classification Search
CPC ........ H01F 41/0246; H01F 1/24; B22F 1/102; B22F 1/16; B22F 2998/10; C22C 2202/02
See application file for complete search history.

(56) References Cited

U.S. PATENT DOCUMENTS

| | | | | |
|---|---|---|---|---|
| 6,309,748 | B1 | 10/2001 | Lashmore et al. | |
| 6,348,265 | B1 | 2/2002 | Jansson et al. | |
| 6,372,348 | B1 | 4/2002 | Hanejko et al. | |
| 6,562,458 | B2 | 5/2003 | Elgelid et al. | |
| 6,756,118 | B2 | 6/2004 | Aichele et al. | |
| 2010/0028195 | A1 | 2/2010 | Maeda et al. | |
| 2011/0285486 | A1 | 11/2011 | Maeda et al. | |
| 2014/0049354 | A1* | 2/2014 | Ye | H01F 41/0246 428/221 |
| 2014/0203205 | A1 | 7/2014 | Kim et al. | |
| 2017/0162307 | A1 | 6/2017 | Ishida | |

FOREIGN PATENT DOCUMENTS

| | | | |
|---|---|---|---|
| EP | 2509081 | A1 | 10/2012 |
| JP | S5189198 | A | 8/1976 |
| JP | 2002170707 | A | 6/2002 |
| JP | 2007088156 | A | 4/2007 |
| JP | 2010126786 | A | 6/2010 |
| JP | 2010185126 | A | 8/2010 |
| JP | 2010251600 | A | 11/2010 |
| JP | 2011187634 | A | 9/2011 |
| JP | 2013505563 | A | 2/2013 |
| JP | 2014515880 | A | 7/2014 |
| TW | 201505042 | A1 | 2/2015 |
| TW | 201730900 | A1 | 9/2017 |
| WO | 2009116938 | A1 | 9/2009 |
| WO | 2011032931 | A1 | 3/2011 |
| WO | 201084812 | A1 | 7/2012 |
| WO | 2012136758 | A2 | 11/2012 |

OTHER PUBLICATIONS

International Search Report (PCT/ISA/210) with translation and Written Opinion (PCT/ISA/237) dated Jul. 16, 2019, by the European Patent Office as the International Searching Authority for International Application No. PCT/EP2019/063717.
Office Action (Notice of Reasons for Refusal) dated Mar. 1, 2023, by the Japanese Patent Office in corresponding Japanese Patent Application No. 2020-566805, and an English Translation of the Office Action. (10 pages).
Office Action dated May 22, 2023 by the Taiwan Intellectual Property Office in corresponding Taiwan Patent Application No. 11220475640. (5 pages).

* cited by examiner

Figure 1: Illustration of Embodiments 1 and 2
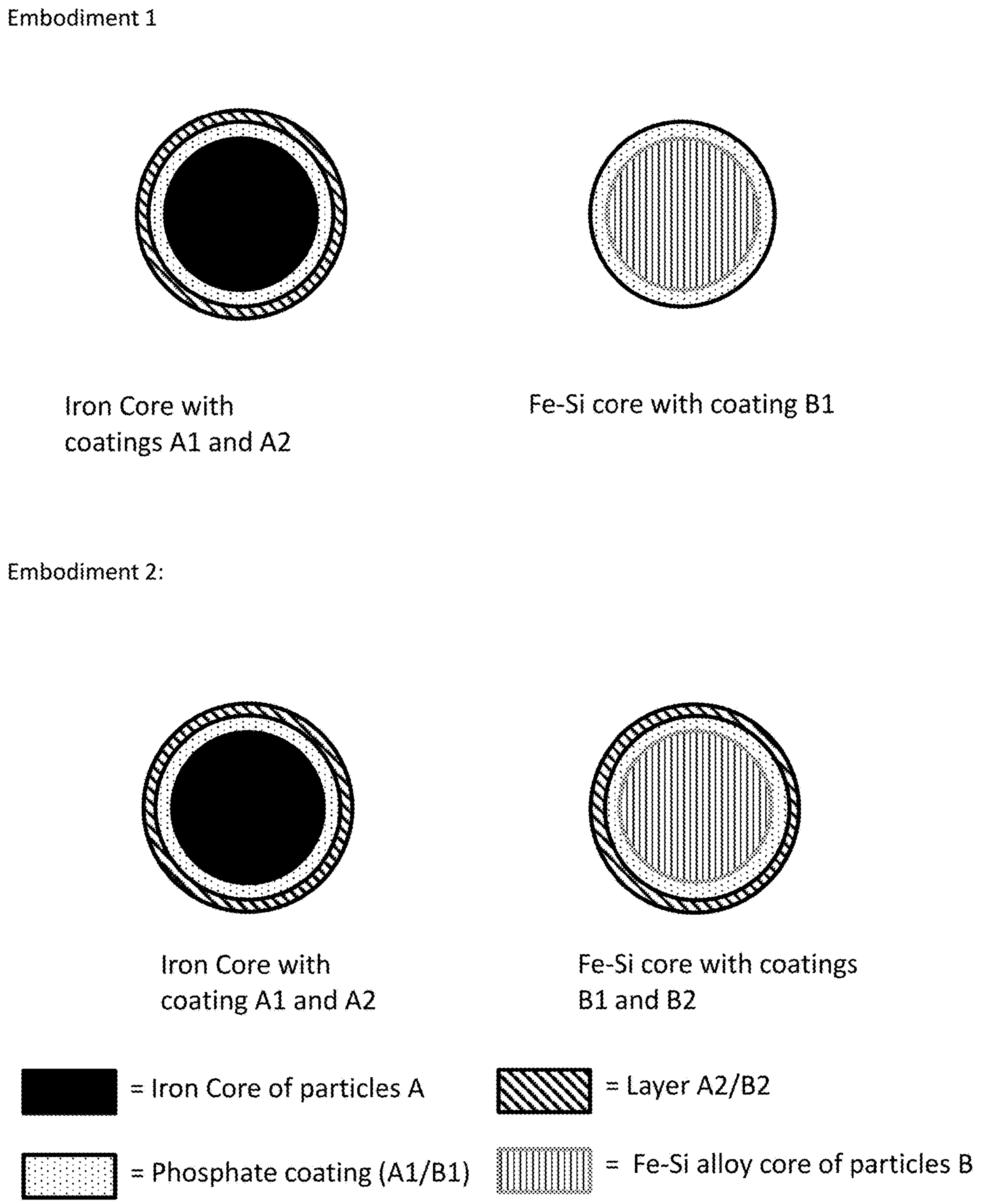

Figure 2. The DC-bias of Samples 1 and 3 measured at 50 kHz.
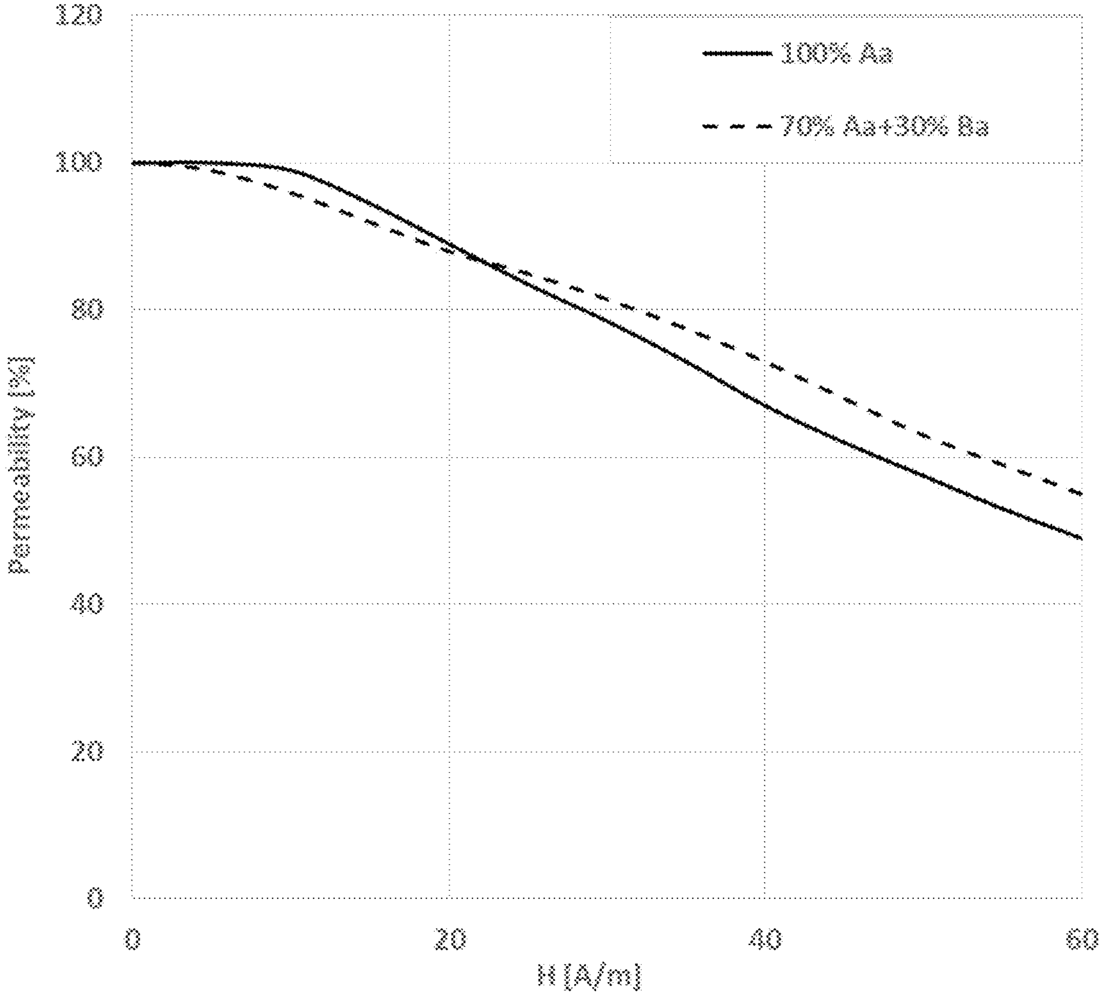

Figure 3: Green strength of the different compositions, 0.4 wt% particulate lubricant added. Materials compacted at 1000 MPa.
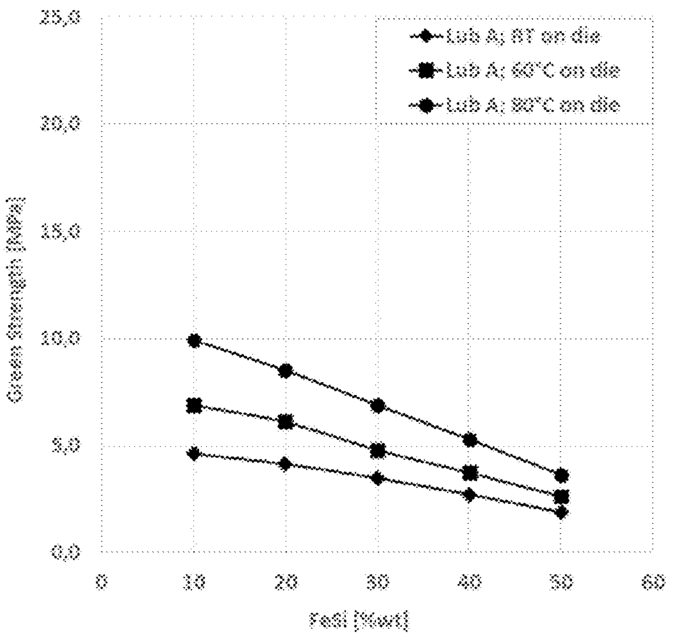
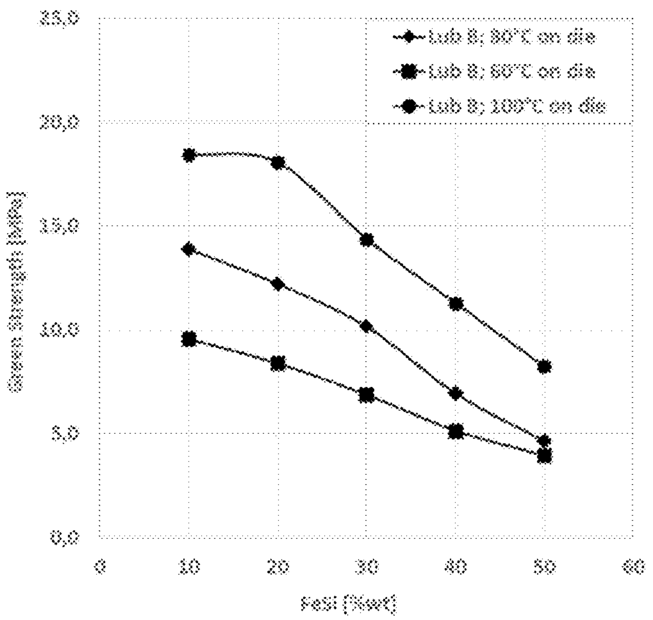

Figure 4: Green strength of the different compositions, 0.4 wt% particulate lubricant added.
Materials compacted at 1200 MPa.
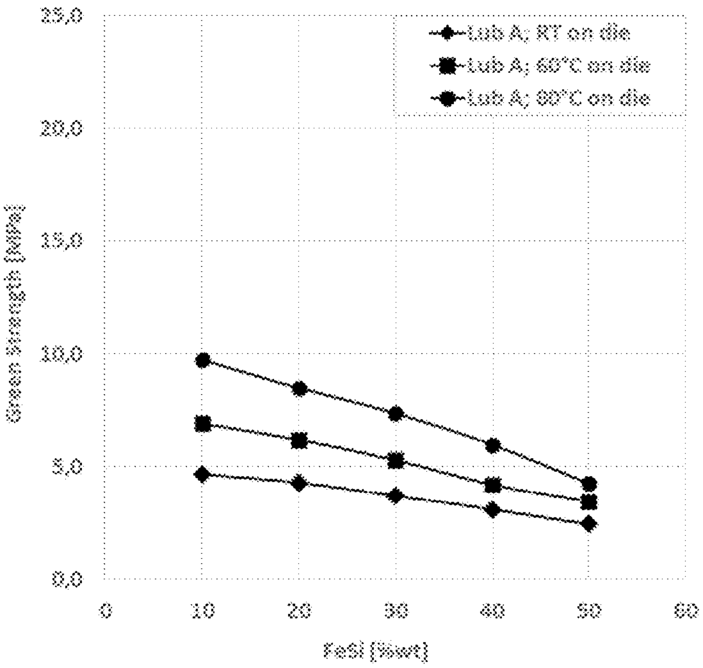
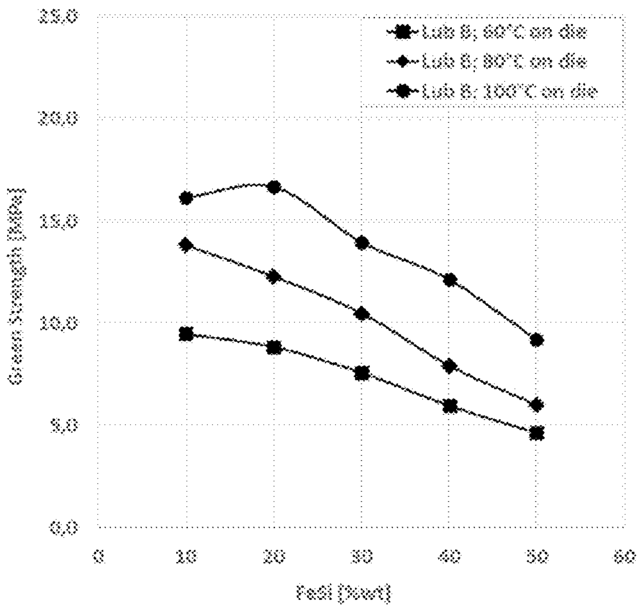

Figure 5. Core losses obtained for components compacted with 80 °C on the die and 0.4 wt% particulate lubricant added. Top: low frequency core loss. Bottom: high frequency core loss.
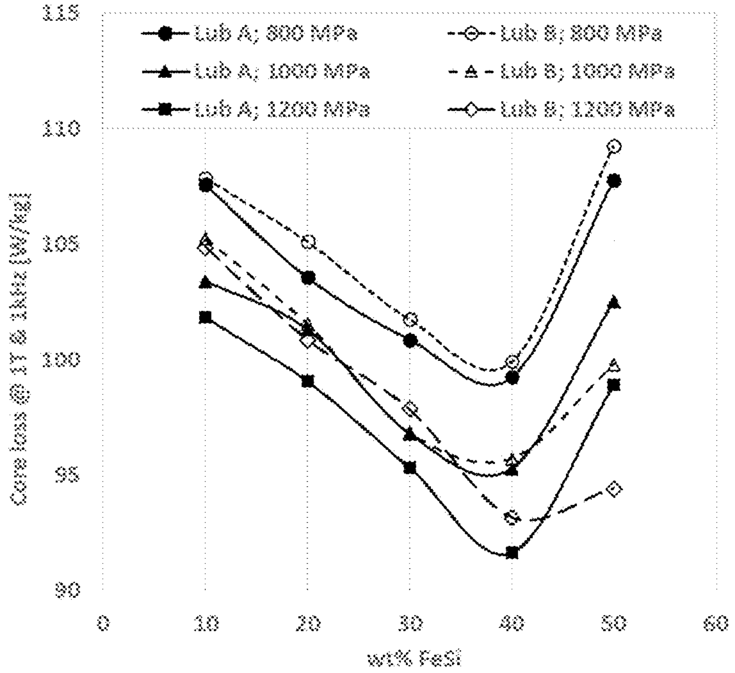
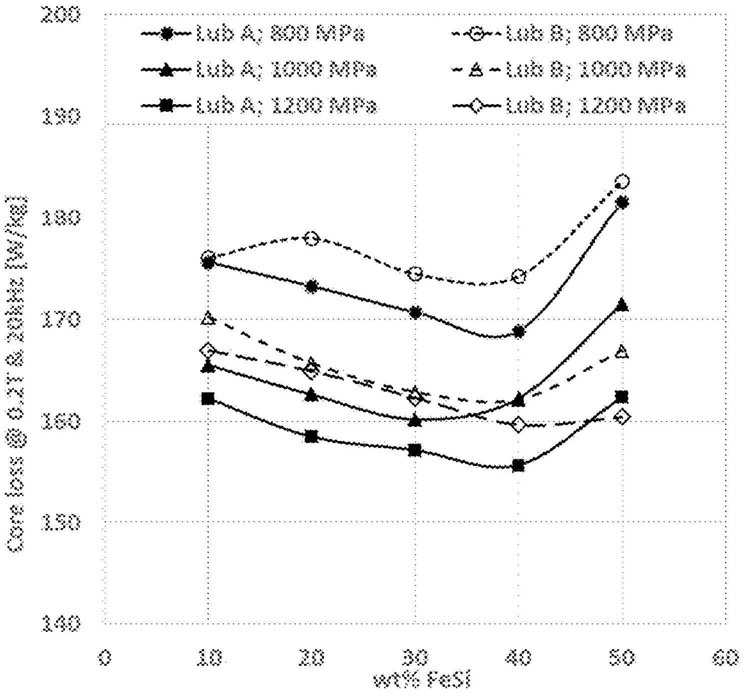

FERROMAGNETIC POWDER COMPOSITION

FIELD OF THE INVENTION

The present invention relates to an electrically insulated iron-based soft magnetic powder composition, a soft magnetic composite component obtainable from the powder composition and a process for producing the same. Specifically, the invention concerns a soft magnetic powder composition for the preparation of soft magnetic components working at high frequencies, the components being suitable for use e.g. as inductors or reactors for power electronics.

BACKGROUND OF THE INVENTION

Soft magnetic materials are used for applications, such as core materials in inductors, stators and rotors for electrical machines, actuators, sensors and transformer cores. Traditionally, soft magnetic cores, such as rotors and stators in electric machines, are made of stacked steel laminates. Soft Magnetic Composite (SMC) materials are based on soft magnetic particles, usually iron-based, with an electrically insulating coating on each particle. The SMC components are obtained by compacting the insulated particles using a traditional powder metallurgical (PM) compaction process, optionally together with lubricants and/or binders. By using the powder metallurgical technique it is possible to produce such components with a higher degree of freedom in the design than by using the steel laminates. By using PM, the obtained components can carry a three dimensional magnetic flux, as three dimensional shapes can be obtained by the compaction process.

An inductor or reactor is a passive electrical component that can store energy in form of a magnetic field created by the electric current passing through said component. An inductors ability to store energy, inductance (L) is measured in henries (H). The simplest inductor is an insulated wire winded as a coil. An electric current flowing through the turns of the coil will create a magnetic field around the coil, the field strength of which will be proportional to the current and the turns/length unit of the coil. A varying current will create a varying magnetic field which will induce a voltage opposing the change of current that created it. The electromagnetic force (EMF), which opposes the change in current, is measured in volts (V) and is related to the inductance according to Equation 1:

$$v(t)=L\ di(t)/dt \qquad \text{Equation 1}$$

where L is inductance, t is time, v(t) is the time-varying voltage across the inductor and i(t) is the time-varying current. That is; an inductor having an inductance of 1 henry produces an EMF of 1 Volt when the current through the inductor changes with 1 Ampere/second.

Ferromagnetic- or iron-core inductors use a magnetic core made of a ferromagnetic or ferrimagnetic material, such as iron or ferrite, to increase the inductance of a coil. Due to the higher permeabilities of these core materials, and the resulting increase of the magnetic field, the inductance can be significantly increased.

Two key characteristics of the SMC component are its magnetic permeability and core loss characteristics. The magnetic permeability, ρ, of a material is an indication of its ability to carry a magnetic flux, i.e. its ability to become magnetised. Permeability is defined as the ratio of the induced magnetic flux, (denoted B and measured in newton/ampere*meter, N/Am or in volt*second/meter$^2$, Vs/m$^2$), to the magnetising force or field intensity, (denoted H and measured in amperes/meter, A/m). Hence, magnetic permeability has the dimension volt*second/ampere*meter, Vs/Am. Normally, magnetic permeability is expressed as the relative permeability $\mu_r=\mu/\mu_0$, relative to the permeability of the free space, $\mu_0=4*\Pi*10^{-7}$ Vs/Am.

Magnetic permeability does not only depend on material carrying the magnetic flux, but also on the applied electric field and the frequency thereof. In technical systems it is often referred to the maximum relative permeability which is maximum relative permeability measured during one cycle of the varying electrical field.

An inductor core may be used in power electronic systems for filtering unwanted signals such as various harmonics. In order to function efficiently, an inductor core for such application shall have a low maximum relative permeability, which implies that the relative permeability will have a more linear characteristic relative to the applied electric field; i.e. stable incremental permeability, $\mu_\Delta$ (as defined according to $\Delta B=\mu_\Delta*\Delta H$), and high saturation flux density. This enables the inductor to work more efficiently in a wider range of electric current, and may also be expressed as that the inductor has “good DC-bias”. DC-bias may be expressed in terms of percentage of maximum incremental permeability at a specified applied electrical field, e.g. at 4000 A/m. Further, a low maximum relative permeability and stable incremental permeability combined with high saturation flux density enables the inductor to carry a higher electrical current which is inter alia beneficial when size is a limiting factor, a smaller inductor can thus be used.

When a magnetic material is exposed to a varying field, energy losses occur due to both hysteresis losses and eddy current losses. The hysteresis loss is proportional to the frequency of the alternating magnetic fields, whereas the eddy current loss is proportional to the square of the frequency. Thus, at high frequencies, the eddy current loss matters mostly and it is especially required to reduce the eddy current loss, while still maintaining a low level of hysteresis losses.

The hysteresis loss (DC-loss) is brought about by the necessary expenditure of energy to overcome the retained magnetic forces within the iron core component. The forces can be minimized by improving the base powder purity and quality, but most importantly by increasing the temperature and/or time of the heat treatment (i.e. stress release) of the component. The eddy current loss (AC-loss) is brought about by the production of electric currents, in the component (bulk eddy currents) and in the soft magnetic particles (in-particle eddy currents), due to the changing flux caused by alternating current (AC) conditions.

A high electrical resistivity of the component is desirable in order to minimise the bulk Eddy-currents. The level of electrical resistivity that is required to minimize the AC losses is dependent on the type of application (operating frequency) and the component size. Further, the individual powder particles have to be coated with a thermally stable electrical insulation, preferably stable above 650° C., in order to decrease the bulk Eddy-currents while maintaining a low level of hysteresis loss. For applications operating at high frequencies, it is desirable to use powders having finer particle size, as the in-particle eddy currents can be restricted to a smaller volume. Thus, fine powders as well as high electrical resistivity will become more important for components working at high frequency.

Regardless of how well the particle insulation works, there will always be unrestricted bulk Eddy-currents within the component causing loss. Since the bulk Eddy-current loss is proportional to the cross sectional area of the compacted part that carries the magnetic flux, the components having large cross-sectional area will require higher electrical resistivity in order to restrict the bulk Eddy current losses.

Insulated iron-based soft magnetic powder having an average particle size of 50-150 μm, e.g. between about 80 μm and 120 μm and 10-30% less than 45 μm (100 mesh powder) may be used for components working from 200 Hz up to 10 kHz, whereas components working at frequencies from 2 kHz up to 50 kHz are normally based on insulated soft magnetic powders having an average particle size about 20-75 μm, e.g. between about 30 μm and 50 μm and more than 50% is less than 45 μm (200 mesh powder). The average particle size and particle size distribution should preferably be optimized according to the requirements of the application.

Research in the powder-metallurgical manufacture of magnetic core components using coated iron-based powders has been directed to the development of iron powder compositions that enhance certain physical and magnetic properties without detrimentally affecting other properties of the final component. Desired component properties include e.g. a suitable permeability through an extended frequency range, high saturation induction, high mechanical strength, and low core losses; which implies that it is desired to increase the resistivity of magnetic cores.

In the search for ways of improving the resistivity, different methods have been used and proposed. One method is based on providing electrically insulating coatings or films on the powder particles before these particles are subjected to compaction. Thus there are a large number of patent publications which teach different types of electrically insulating coatings. Examples of published patents concerning inorganic coatings are the U.S. Pat. Nos. 6,309,748, 6,348,265 and 6,562,458. Coatings of organic materials are known from e.g. the U.S. Pat. No. 5,595,609. Coatings comprising both inorganic and organic material are known from e.g. the U.S. Pat. Nos. 6,372,348 and 5,063,011 and the DE patent publication 3,439,397, according to which publication the particles are surrounded by an iron phosphate layer and a thermoplastic material. European Patent EP1246209B1 describes a ferromagnetic metal-based powder wherein the surface of the metal-based powder is coated with a coating consisting of silicone resin and fine particles of clay minerals having layered structure such as bentonite or talc.

U.S. Pat. No. 6,756,118B2 reveals a soft magnetic powder metal composite comprising a least two oxides encapsulating powdered metal particles, the at least two oxides forming at least one common phase.

The patent application JP2002170707A describes an alloyed iron particle coated with a phosphorous containing layer, the alloying elements may be silicon, nickel or aluminium. In a second step the coated powder is mixed with a water solution of sodium silicate followed by drying. Dust cores are produced by moulding the powder and heat treat the moulded part in a temperature of 500-1000° C.

Sodium silicate is mentioned in JP51-089198 as a binding agent for iron powder particles when producing dust cores by moulding of iron powder followed by heat treating of the moulded part.

High densities normally improve the magnetic properties. Specifically, high densities are needed in order to keep the hysteresis losses at a low level and to obtain high saturation flux density. In order to obtain high performance soft magnetic composite components, it must therefore also be possible to subject the electrically insulated powder composition to compression moulding at high pressures without damaging the electrical insulation, after which the component should be easily ejected from the moulding equipment without damages on the component surface. Which in turn means that the ejection forces must not be too high.

Furthermore, in order to reduce the hysteresis losses, stress releasing heat treatment of the compacted part is required, and to obtain an effective stress release the heat treatment should preferably be performed at a temperature above 300° C. and below a temperature where the insulating coating will be damaged, in an atmosphere of for example nitrogen, argon or air, or in vacuum.

The present invention relates to an iron-based soft magnetic composite powder, the core particles thereof being coated with a carefully selected coating rendering the material properties suitable for production of inductors through compaction of the powder, optionally and preferably followed by a heat treating process.

The present invention has been done in view of the need for powder cores which are primarily intended for use at higher frequencies, i.e. frequencies of 2 kHz and higher, and particularly between 5 and 100 kHz, where higher resistivity and lower core losses are essential. Preferably, the saturation flux density shall be high enough for core downsizing. Additionally, it should be possible to produce the cores without having to compact the metal powder using die wall lubrication and/or compaction pressures above 1200 MPa.

OBJECTS OF THE INVENTION

One object of the present invention is to provide a new iron-based composite powder that can be compacted into soft magnetic components with a high resistivity and a low core loss, the new iron based composite powder being especially suited to be used for production of inductor cores for power electronics.

Another object of the invention is to provide an iron-based powder composition comprising an electrically insulated iron-based powder that can be compacted into soft magnetic components having high strength, suitable maximum permeability, and high induction.

It is a further object of the invention to provide means for minimizing the hysteresis loss without deteriorating the electrically insulated coating of the iron-based powder, keeping the bulk Eddy current loss at a low level.

Yet another object of the invention is to provide an iron-based powder composition, comprising an electrically insulated iron-based powder, to be compacted into soft magnetic components having sufficiently high green strength to enable a decrease of the compaction pressure while maintaining good magnetic performance.

A further object of the invention is to provide a method for producing soft magnetic components having high strength, high induction, and low core loss, minimizing hysteresis loss while keeping Eddy current loss at a low level.

Another object of the invention is to provide a method for producing a compacted, and optionally heat treated, soft magnetic iron-based composite inductor core having low core losses and a "good" DC-bias in combination with sufficient mechanical strength, and acceptable magnetic flux density (induction).

Another object of the present invention is to provide a means for allowing to avoid the use of organic binding agents, as these may give rise to problems during high temperature heat treatments due to e.g. decomposition, thereby allowing to increase flux density and to decrease core losses.

It is a further object of the present invention to provide a means for improving the magnetic properties of a soft magnetic composite material, in particular for improving the core loss and/or the DC bias.

The present invention provides an iron-based composite powder and process methods for treating said mixture which can be used to prepare e.g. inductors having high saturation flux density, lower core loss, and for which the manufacturing process thereof can be simplified significantly.

BRIEF DESCRIPTION OF THE DRAWINGS

FIG. 1 is a graphical representation of two embodiments of the invention, wherein in Embodiment 1 the particle A has the coating layers A1 and A2 and the particle B has the coating layer B1 only, and wherein in embodiment 2 the particle B has both the coating layers B1 and B2. Note that the particle sizes and coating layer thicknesses of the particles A and B may be different, and that FIG. 1 may not reflect the true scale of the particles and their coatings.

FIG. 2 illustrates the DC bias of Samples 1 and 3, as derivable from the change in permeability at different field strengths, measured at 50 kHz, as obtained in the Examples.

FIG. 3 shows the green strength of different compositions of the Examples with 0.4 wt % particulate lubricant added, compacted at 1000 MPa, and using different die temperatures and different lubricants (top: Lub A, an amide wax, bottom: Lub B, a composite lubricant in accordance with WO2010/062250)

FIG. 4 shows the green strength of different compositions of the Examples with 0.4 wt % particulate lubricant added, compacted at 1200 MPa, and using different die temperatures and different lubricants (top: Lub A, bottom: Lub B).

FIG. 5 shows the core losses obtained for components compacted with 80° C. on the die and 0.4 wt % of different particulate lubricants added. Top: Low frequency (1 kHz) core loss at 1 T. Bottom: high frequency (20 kHz) core loss at 0.2 T.

SUMMARY OF THE INVENTION

To achieve at least one of the above-mentioned objects and/or further objects not mentioned, which will appear from the following description, the present invention provides the following:

1. A composition comprising particles A and particles B, each of the particles A and B comprising a core, the core of the particles A being a soft magnetic iron based core, and the core of the particles B being formed from an Fe—Si alloy, wherein the surface of each core of the particles A and B is coated with a phosphorus-containing insulating layer A1 respectively B1, and wherein the particles A having the insulating coating layer A1 are provided with a further layer A2 on top of the layer A1, the layer A2 being formed from a compound of formula (I), or a reaction product thereof:

$$M(OR_1)_x(R_2)_y \qquad \text{Formula (I)}$$

wherein M is selected from Si, Ti, Al, or Zr; preferably Si or Ti, and more preferably Si, $R_1$ is a straight or branched alkyl group having 4 or less, preferably 3 or less carbon atoms, preferably an ethyl group or a methyl group;

$R_2$ is an organic group optionally containing a functional group, and x+y are integers denoting the number of groups $OR_1$ and $R_2$, respectively, and are if M is Si, Zr or Ti, x is chosen from 1, 2 and 3, and y is chosen from 1, 2 and 3, with the proviso that (x+y)=4; and if M is Al, then x is chosen from 1 and 2, and y is chosen from 1 and 2, with the proviso that (x+y)=3;

and wherein the particles A further comprise particles C that are adhered to the layer A2 or which are incorporated into the layer A2, the particles C being particles of a material having Mohs hardness of 3.5 or less.

2. Composition according to item 1, wherein the particles B are provided with a layer B2 on the layer B1, the layer B2 being formed from a compound of formula (I), or a reaction product thereof:

$$M(OR_1)_x(R_2)_y \qquad \text{Formula (I)}$$

wherein M is selected from Si, Ti, Al, or Zr; preferably Si or Ti, and more preferably Si, $R_1$ is a straight or branched alkyl group having 4 or less, preferably 3 or less carbon atoms, preferably an ethyl group or a methyl group;

$R_2$ is an organic group optionally containing a functional group, and x+y are integers denoting the number of groups $OR_1$ and $R_2$, respectively, and are if M is Si, Zr or Ti, x is chosen from 1, 2 and 3, and y is chosen from 1, 2 and 3, with the proviso that (x+y)=4; and if M is Al, then x is chosen from 1 and 2, and y is chosen from 1 and 2, with the proviso that (x+y)=3, and wherein optionally the particles B contain contains particles C that are adhered to or incorporated into the layer B2.

3. Composition according to item 1, wherein the core particles of the particles A have an apparent density of 3.3-3.7 g/ml, preferably 3.3-3.6 g/ml, preferably 3.35-3.6 g/ml; e.g. 3.4-3.6 g/ml, 3.35-3.55 g/ml, or 3.4-3.55 g/ml, and particles B have an apparent density of 3.0-5.5 g/ml, preferably 3.5-5.5 g/ml, preferably 4.0-5.0 g/ml; e.g. 4.3-4.8 g/ml.

4. Composition according to any one of items 1-3, wherein said powder composition further comprises a lubricant.

and/or B2 is formed from a compound of formula (I), or wherein the layer A2 and/or B2 is formed from an a reaction product of a compound of formula (I), wherein the number of metal atoms M in one molecule is from 2-20.

6. Composition according to any one of items 1-5, wherein $R_2$ includes one or more of the following functional groups: amine, diamine, amide, imide, epoxy, mercapto, disulfido, chloroalkyl, hydroxyl, ethylene oxide, ureido, urethane, isocyanato, acrylate, glyceryl acrylate, carboxyl, carbonyl, and aldehyde, with amine and diamine being preferred.

7. Composition according to any one of items 1 to 6, wherein the compound of formula (I) or a reaction product thereof is an oligomer of the compound of formula (I), and wherein the oligomer is selected from alkoxy-terminated amino-silsesquioxanes, amino-siloxanes, oligomeric 3-aminopropyl-alkoxy-silane, 3-aminopropyl/propyl-alkoxy-silane, N-aminoethyl-3-aminopropyl-alkoxy-silane, or N-aminoethyl-3-aminopropyl/methyl-alkoxy-silane, or mixtures thereof.

8. Composition according to any one of items 1 to 7, wherein the particles C include bismuth or bismuth (III) oxide.

9. Composition according to any one of items 1-8, wherein the weight ratio of particles A and B (A:B) is from 95:5 to 50:50, preferably 90:10 to 60:40, and most preferably 80:20 to 60:40.
10. A method for producing a compacted and heat-treated component, comprising the steps of
a) providing a composition as defined in any one of items 1 to 9,
b) compacting the composition, optionally mixed with a lubricant, in a uniaxial press movement in a die, preferably at a compaction pressure between 400 and 1200 MPa,
c) ejecting the compacted component from the die, and
d) heat-treating the ejected component in a non-reducing atmosphere at a temperature of up to 800° C.
11. Component, obtainable by compacting a composition as defined in any one of items 1 to 9 or by the method according to item 10.
12. Component according to item 11, which is an inductor core.
13. Inductor core according to item 12, having a resistivity ρ of 3,000 μΩm or higher, preferably 6,000 μΩm or higher or 10,000 μΩm or higher; a saturation magnetic flux density Bs of 1.1 T or higher, preferably 1.2 T or higher or 1.3 T or higher; a core loss of 21 W/kg or less at a frequency of 10 kHz and an induction of 0.1 T; a coercivity of 200 A/m or less, preferably 190 A/m or less or 160 A/m or less; and a DC-bias of not less than 50% at 4,000 A/m.
14. Use of coated Fe—Si alloy particles as specified above for the particles B having the coating layer B1 for improving the magnetic properties of an soft magnetic composite material, preferably core loss and/or DC bias.
15. Use according to item 14, wherein the Fe—Si particles are coated with a layer B1 and a layer B2 as defined in item 2.

Further embodiments and aspects of the invention will become apparent from the following detailed description.

Definitions

In the present invention, all physical parameters are measured at room temperature (20° C.) and at atmospheric pressure ($10^5$ Pa), unless indicated differently.

As used herein, the indefinite article "a" indicates one as well as more than one and does not necessarily limit its reference noun to the singular.

The term "about" means that the amount or value in question may be the specific value designated or some other value in its neighborhood, generally within a range of ±5% of the indicated value. As such, for instance the phrase "about 100" denotes a range of 100±5.

The term and/or means that either all or only one of the elements indicated is present. For instance, "a and/or b" denotes "only a", or "only b", or "a and b together". In the case of "only a" the term also covers the possibility that b is absent, i.e. "only a, but not b".

The term "comprising" as used herein is intended to be non-exclusive and open-ended. A composition comprising certain components thus may comprise other components besides the ones listed. However, the term also includes the more restrictive meanings "consisting of" and "consisting essentially of". The term "consisting essentially of" allows for the presence of up to and including 10 weight %, preferably up to and including 5% of materials other than those listed for the respective composition, which other materials may also be completely absent.

Whenever reference is made to measurable parameters, the methods employed in the examples are used. Additionally, standard methods in the art can be used, such as specified in ISO 13320-1:1999, for the determination of particle sizes and particle size distributions by laser diffraction. Particle sizes can also be classified by dry sieving, e.g. according to ISO 1497:1983. Resistivity can be determined by a Four-Point Probe measurement, as described by. Smits, F. M., "Measurements of Sheet Resistivity with the Four-Point Probe" BSTJ, 37, p. 371 (1958). In case of any discrepancy, the methods employed in the examples of the present invention prevail.

All documents referred to in the present specification are incorporated herein by reference in their entirety.

DETAILED DESCRIPTION OF THE INVENTION

In a first aspect, the invention concerns a composition comprising, essentially consisting of, or consisting of i) Particles A, each comprising an iron-based core and two or more coating layers surrounding the core, wherein the two or more coating layers include a first coating layer A1 that is provided on the surface of the core, which layer A1 is a phosphorous-based insulating coating layer, and a second layer A2, which is provided on the layer A1 and which is described below; and
ii) Particles B, each comprising a core made from an alloy comprising Fe and Si, or consisting essentially of Fe and Si, wherein the surface of the FeSi core is provided at least with a phosphorous-based insulating layer B1, and optionally a second layer B2, which is provided on the layer B1 and which is described below.

The particles A and B are distinct from each other, at least in the nature of the composition of the core. The soft magnetic core of the particles A is hence not an alloy comprising Fe and Si as specified below for the particles B.

The core of the particles A preferably have an apparent density (AD) which has been increased between 7-25% by grinding, milling or other processes which will physically alter the irregular surface. The AD of particles A, as measured according to ISO 3923-1, should in the range of 3.2-3.7 g/ml, preferably 3.3-3.7 g/ml, preferably 3.3-3.6 g/ml, more preferably in the range from above 3.3 g/ml to below or equal to 3.6 g/ml, preferably between 3.35 and 3.6 g/ml; or 3.4 and 3.6 g/m; or 3.35 and 3.55 g/ml; or between 3.4 and 3.55 g/ml.

In another embodiment, the powder composition may comprise a lubricant.

The invention further concerns a process for the preparation of soft magnetic composite materials comprising: compacting, preferably uniaxially, a composition according to the invention in a die at a compaction pressure of preferably 400 to 1200 MPa, more preferably 600-1200 MPa; and if a lubricant is present, optionally pre-heating the die to a temperature below the melting temperature of the added lubricant; ejecting the obtained green body; and optionally heat-treating the body. A composite component according to the invention preferably has a phosphorus content (P) of 0.01-0.1% by weight, a content of added M (which is preferably Si) of 0.02-0.12% by weight, and a content of Bi, added in the form of a metallic or semi-metallic particulate compound C, between 0.05-0.35% by weight.

Each of the components of the present invention will subsequently be described in more detail, yet without wishing to limit the invention to the concrete embodiments described.

Core of the Particles A

The iron-based core particles of the particles A may be of any origin, such as resulting from water atomization, gas atomization or sponge iron powder. A water atomized particle is preferred.

The iron-based soft magnetic core may be selected from the group consisting of essentially pure iron, which means that the iron content is 90% by weight or more, preferably 95% by weight or more, more preferably 99% by weight or more. The remainder may be any material or element other than Si. Particularly preferably, the core consists of iron and unavoidable impurities. These may be present in an amount of up to 0.1% by weight.

Core of the Particles B

The core of Particles B are made from an iron alloy including iron and silicon (Si), the core preferably being gas atomized. Besides iron and silicon, other alloying metals may also be present, but to a lesser extent than Si. Fe makes up 80% by weight or more of the alloy forming the core of the particles B, more preferably 90% by weight or more.

The remainder is formed by unavoidable impurities and other alloying metals, including at least Si. Si forms at least 1% by weight or the alloy forming the core of the particles B, preferably 2.5% by weight or more, and still further preferably 4% by weight or more. The upper limit of Si is 15% by weight or less, but typically 10% by weight or less of Si is present. Preferably the upper limit of the amount of Si is 9% by weight or less or 8% by weight or less, but may also be 7% or less. The amount of unavoidable impurities and other elements but Fe and Si is typically 10% by weight or less, more preferably 5% by weight or less, and still further preferably 2% by weight or less. It may also be as low as 1.0 or 0.1% by weight or less, the remainder being Fe and Si. Such other alloying elements may include Al, Ni, Co, or combinations thereof.

In one embodiment, the core of the particles B is made from an Fe—Si alloy consisting of 90% by weight or more of Fe and 10% or less of Si as well as unavoidable impurities in an amount of 0.2% by weight or less, preferably 0.1% by weight or less. In a preferred aspect of this embodiment, the amount of Si is from 4.0 to 7.0% by weight, the remainder being formed by Fe and unavoidable impurities in an amount of 0.2% by weight or less, such as 0.1% by weight or less.

Shape of Particles A and B

It has now also surprisingly been found that further improvement of the electrical resistivity of the compacted and heat treated component according to the invention can be obtained if particles having a smooth particle surface are used as core of the particles A. Such suitable morphology is manifested e.g. by an increase in the apparent density of above 7% or above 10%, or above 12% or above 13% for an iron or iron-based powder resulting in an apparent density of 3.2-3.7 g/ml, preferably above 3.3 g/ml and below or equal to 3.6 g/ml, preferably between 3.4 and 3.6 g/ml, or between 3.35 and 3.55 g/ml.

Such powders with the desired apparent density may be obtained from the gas-atomization process or water atomized powders. If water atomized powders are used, they preferably are subjected to grinding, milling or other processes, which will physically alter the irregular surface of the water atomized powders. If the apparent density of the powders is increased too much, above about 25% or above 20%, which means for a water-atomized iron based powder above about 3.7 or 3.6 g/ml the total core loss will increase.

It has also been found that the shape of the core particles influences the results in e.g. resistivity. The use of irregular particles gives a lower apparent density and lower resistivity than if the particles are of a less uneven and smoother shape. Thus, particles being nodular, i.e. rounded irregular particles, or spherical or almost spherical particles are preferred according to the present invention. As high resistivity will become more important for components working at high frequencies, where powders having finer particle size are preferably used (such as 100 and 200 mesh), "high AD" becomes more important for these powders.

Amounts of the Particles

The composition of the present invention contains the particles A and B with their respective coating layers. The amount of the total of the particles A and B (including their coating layer(s)), relative to the total weight of the composition, is preferably 85% by weight or more, more preferably 90% by weight or more, further preferably 95% by weight or more, such as 98% by weight or more, and can be up to 100% by weight.

The amount of the particles B, including their coating layer(s), is preferably from 5 to 50% by weight, more preferably 10-40% by weight, relative to the total weight of the particles A and B (i.e. [B]/[B+A]×100=5-50, preferably 10-40). It may also be from 20 to 40% by weight. The weight ratio of the particles is preferably from 95:5 to 50:50, preferably 90:10 to 60:40, and most preferably 80:20 to 60:40, expressed as [A]:[B].

Besides the particles A and B, including their coating layer(s), the composition may optionally further contain additives such as lubricants.

The amount of lubricant is preferably below 1% by weight or less, relative to the total weight of the composition, more preferably below 0.7% by weight or most preferably below 0.5% by weight or less.

Size of the Particles' Cores

While the particle sizes of the particles A and B are not restricted and are also determined by the intended use of the manufactured part, it is preferred that the median (by weight) particle size of the cores of the particles A and B, Dw50, is 250 micron or less, more preferably 75 micron or less, such as 45 micron or less.

First Coating Layer (Inorganic) A1/B1

Each of the cores forming the particles A and B are provided with a first inorganic insulating layer, A1 respectively B1. Methods for forming such coatings are described in e.g. WO 2009/116 938 A1.

The layers A1 and B1 are phosphorous-based, which means that they contains P in an amount of at least 5 atom %, preferably at least 8 atom % or more, and further preferably 10 atom % or more, expressed as elementary P and determined by a usual method such as ESCA or XPS. The phosphorous is preferably present in the form of a phosphate, diphosphate or polyphosphate, in which case the cations are preferably selected from protons, alkali metals and earth alkaline metals, preferably protons, sodium and potassium.

This first coating layer A1/B1 may be obtained by treating the respective core particles with phosphoric acid solved in either water or organic solvents. In water-based solvent rust inhibitors and tensides are optionally added. A preferred method of coating the iron-based powder particles is described in U.S. Pat. No. 6,348,265. The treatment may be performed once, but may also be repeated. The phosphorous based coating layer A1/B1 is preferably without any additions such as dopants, rust inhibitors, or surfactants. The coating A1/B1 is an insulating coating. Optionally, the coating may be neutralized by treatment with a suitable base.

The amount of phosphor in the layers A1 and B1 may be between 0.01 and 0.15 wt % of the entire composition.

Second Coating Layer A2/B2

The layer A2, which is located on the first phosphorous-based inorganic insulating layer A1 of the particles A, is a layer that is formed by a compound of the following general Formula (I), or a reaction product thereof. Herein, the term "reaction product" means a product that is obtained by reaction of one molecule of a compound of formula (I) with another molecule of a compound of formula (I) and/or the layer A1 or B1, and examples of the reaction product include a partial or total condensate thereof.

$$M(OR_1)_x(R_2)_y \qquad \text{Formula (I)}$$

In Formula (I), M is selected from Si, Ti, Al, or Zr; preferably Si or Ti, and more preferably Si; $R_1$ is an alkyl group having 4 or less, preferably 3 or less carbon atoms, and more preferably an ethyl group—$C_2H_5$ or a methyl group—$CH_3$.

$R_2$ is an organic group optionally containing a functional group, and preferably R2 includes 1-14, more preferably 1 to 8 carbon atoms, further preferably 1 to 6 carbon atoms, such as 1 to 3 carbon atoms. The $R_2$ group may be linear, branched, cyclic, or aromatic, and is preferably a straight or banched alkyl group.

In one embodiment, the optional functional group of R2 is present, and is then preferably selected from groups including one or more heteroatoms selected from the group consisting of N, O, S, P and halogen atoms, with N, O, S and P being preferred. Examples of such groups include amine, diamine, amide, imide, epoxy, mercapto, disulfido, chloroalkyl, hydroxyl, ethylene oxide, ureido, urethane, isocyanato, acrylate, glyceryl acrylate, carboxyl, carbonyl, and aldehyde.

Further, x+y are integers denoting the number of groups $OR_1$ and $R_2$, respectively, which are selected to satisfy the valency of M. In case M is Si, Zr or Ti, (x+y)=4, and if M is Al, then (x+y)=3.

In case of M being Si, Zr or Ti, x is chosen from 1, 2 and 3, and y is chosen from 1, 2 and 3, with the proviso that (x+y)=4; while in case of M being Al, x is chosen from 1 and 2, and y is chosen from 1 and 2, with the proviso that (x+y)=3.

The layer is referred to as layer A2 in the following. In one embodiment, the layer A2 may be formed on only the particles A having the insulating layer A1, but not on the particles B having the coating layer B1 ("Embodiment 1"). In another embodiment (also referred to as "Embodiment 2"), a layer that is formed by a compound of the general Formula (I), or a reaction product thereof, such as a partial or total condensate thereof, optionally together with Particles C, is also present on the layer B1 of the particles B, and in this case the layer is referred to as layer B2 (see FIG. 1). The description and definition of the layer B2 is hence the same as that of the layer A2, the particles A and B in such a case being distinguished by their different cores. The layer A2 and B2 may be formed from the same compound simultaneously by treating a mixture of particles A having the layer A1 and particles B having the layer B1 with a compound of formula (I)), but they may also be formed separately by using different compounds of formula (I) or reaction products thereof for forming the layers A2 and B2, respectively.

The layer A2, and the optional layer B2, may be formed from a compound of Formula (I) and Particles C, yet may at least in part also be formed by a (poly)condensation reaction product of Formula (I), thereby incapsulating Particles C. For instance, if the compound of Formula (I) is trimethoxy aminopropyl silane, the layer may be formed by a (poly) condensate thereof that is formed under formation of alcohol (methanol in this case). Such a reaction product preferably contains from 2 to 50, and more preferably from 2 to 20 atoms M in one molecule. In such a (poly)condensation reaction, the groups OR1 are eliminated by releasing HOR1, leaving a M-O-M bond (2 atoms M in the (poly)condensate). In case of 3 M atoms in the polycondensate, an M-O-M-O-M linkage is formed, etc. Herein, each M still carries the $R_2$ groups present in the starting material.

In case M is Si, Ti or Zr and x=2 and y=2, a linear molecule having a plurality of M-O-M linkages is formed, such as M-O-M-O-M-O-M. The R2 groups remain, so that the compound may be represented by (H or $R_1$)O-M$(R_2)_2$—O-$(MR_2)_2$—O-$(MR_2)_2$—. In case that M is Si, Ti or Zr and x=3 and y=1, a three-dimensional polysiloxane network is formed, wherein each M still carries one group $R_2$.

In each of these cases, the groups R1 and R2 may be different from each other. Further, if both particles A and B contain the respective layers A2 and B2, the layers may be formed from the same compound of formula (I) or a reaction product thereof, or may be formed of different compounds of formula (I) or reaction products thereof.

In order to be able to form condensate, traces of water or another agent capable of initiating or catalyzing the condensation reaction may be beneficial. Such water may be present on the particles on which the coating layer A2, and optionally B2, is to be formed, e.g. in the presence of physisorbed water present on the phosphorous-containing coating A1 or B1. Further, the phosphorous containing layers A1 and B1 are typically based on phosphates or phosphoric acids containing $PO_4^{3-}$ groups that may fully or partially be neutralized by protons. Without wishing to be bound by theory, it is believed that these groups may initiate a reaction such as to react with the compound of Formula (I) to form a P—O-M linkage. For instance, a P—OH group in the phosphorous-containing layer A1 or B1 may react with a group OR1 by eliminating HO—R1 and forming a P—O-M linkage, thereby fixing the layer A2 (and B2, if present) to the layer A1 or B2, respectively. Further information on the formation of the coating layers A2 and B2 can be found n WO 2009/116938 A1, which is hereby incorporated by reference in its entirety.

In one embodiment, the compound of formula (I) is selected from trialkoxy and dialkoxy silanes, titanates, aluminates, or zirconates. In one embodiment, the layer A2 and/or B2 comprises an oligomer of a compound of formula (I) selected from alkoxy-terminated alkyl/alkoxy oligomers of silanes, titanates, aluminates, or zirconates. Herein, the central atom (preferably Si) includes preferably an amine group as substituent on an alkyl group (i.e. $R_2$ is an alkyl amine).

Both particles A and B have a first coating layer A1 and B1, respectively, as shown above. The particles A further have a second coating layer, A2, that is provided on the layer A1. The particles B optionally have second coating layer, B2, that is provided on the layer B1.

In one embodiment, both particles A and B have the coating layer A2 and B2, respectively, whereas in another embodiment only the particles A have the coating layer A2. In this case, the particles B, not having the coating layer B2, have the insulating layer B1 as outermost layer. Otherwise, the layer A2 (and B2, if present) is typically the outermost layer of the particles A and B, wherein the particles C are incorporated into or adhere to the layer A2 and optionally B2.

The compound of Formula (I) may also be selected from derivates, intermediates or oligomers of silanes, siloxanes and silsesquioxanes, wherein M is Si, or the corresponding titanates, aluminates or zirconates, wherein M is Ti, Al and Zr, respectively, or mixtures thereof.

According to one embodiment, the layer A2 and optionally B2 is formed by a compound of Formula (I). The layer thus contains a compound of Formula (I), and/or a reaction product thereof with the underlying phosphorus-based insulating layer A1/B1.

According to another embodiment, the layer A2 and/or B2 contains a reaction product of a compound of Formula (I) itself, i.e. a reaction product of one molecule of a compound of formula (I) with another molecule of a compound of formula (I). Herein, the number of metal atoms M per molecule of the reaction product is 2 or higher, but preferably 5 or higher, and 50 or less, preferably 20 or less. This reaction product is a polycondensate of two or more compounds of Formula (I) wherein the compounds may be the same or different from each other.

In one embodiment, the layer A2 and/or B2 may have a homogeneous composition, which means that the entire layer is formed of e.g. a compound of Formula (I), or alternatively by a polymer thereof. In another embodiment, the layer A2 and/or B2 may be formed by two or more sub-layers having different compositions. For instance, the layer A2 and/or B2 may include two or more sub-layers. Herein, the layer directly on the insulating phosphorus-based insulating layer may be formed by the compound of Formula (I) only, whereas a further sub-layer on top of this layer may be formed of an oligomer or polymer of the compound of Formula (I). The ratio by weight of the sub-layer including the compound of Formula (I) and the layer of the oligomer or polymer thereof may take any value, but is preferably between 1:0 and 1:2, and more preferably between 2:1-1:2.

If there are two or more compounds of Formula (I), or reaction products thereof, the chemical functionality thereof is necessary not same.

The compound of Formula (I) is in one embodiment selected from the group of trialkoxy and dialkoxy silanes, titanates, aluminates, or zirconates, and examples include 3-aminopropyl-trimethoxysilane, 3-aminopropyl-triethoxysilane, 3-aminopropyl-methyl-diethoxysilane, N-aminoethyl-3-aminopropyl-trimethoxysilane, N-aminoethyl-3-aminopropyl-methyl-dimethoxysilane, 1,7-bis (triethoxysilyl)-4-azaheptan, triamino-functional propyltrimethoxysilane, 3-ureidopropyl-triethoxysilane, 3-isocyanatopropyl-triethoxysilane, tris(3-trimethoxysilylpropyl)-isocyanurate, 0-(propargyloxy)-N-(triethoxysilylpropyl)-urethane, 1-aminomethyl-triethoxysilane, 1-aminoethyl-methyl-dimethoxysilane, or mixtures thereof. These kinds of compounds may be commercially obtained from companies, such as Evonik Ind., Wacker Chemie AG, Dow Corning, Mitsubishi Int. Corp., Famas Technology Sàrl, etc.

An oligomer or polymer of the compound of Formula (I) may be selected from alkoxy-terminated alkyl-alkoxy-oligomers of silanes, titantes, aluminates, or zirconates. The oligomer may thus be selected from methoxy, ethoxy or acetoxy-terminated amino-silsesquioxanes, amino-siloxanes, oligomeric 3-aminopropyl-methoxy-silane, 3-aminopropyl/propyl-alkoxy-silanes, N-aminoethyl-3-aminopropyl-alkoxy-silanes, or N-aminoethyl-3-aminopropyl/methyl-alkoxy-silanes or mixtures thereof.

The total amount of the layer A2 and B2, if present, is not particularly limited, but may e.g. be 0.05-0.8%, or 0.05-0.6%, or 0.1-0.5%, or 0.2-0.4%, or 0.3-0.5% by weight of the entire composition.

In all of the above mentioned embodiments include addition of Particles C made of a metal or semi-metal, or compound thereof, having a Mohs hardness of 3.5 or less, preferably 3.0 or less. The Particles C preferably have an weight median particle size $D_w50$ of 5 μm or less, more preferably 3 μm or less, and most preferably 1 μm or less. The Mohs hardness of the metallic or semi-metallic particulate compound is preferably 3.0 or less, more preferably 2.5 or less. $SiO_2$, $Al_2O_3$, MgO, and $TiO_2$ are abrasive and have a Mohs hardness well above 3.5, and are hence not included in the invention. Abrasive compounds, even as nano-sized particles, may cause irreversible damages to the electrically insulating coating, giving poor ejection and worse magnetic and/or mechanical properties of the heat-treated component.

Examples of the material of the particles C include the groups: lead-, indium-, bismuth-, selenium-, boron-, molybdenum-, manganese-, tungsten-, vanadium-, antimony-, tin-, zinc-, cerium-based compounds, and one or more thereof may be used. The respective metals may also be used per se.

The particles C may be made of an oxide, hydroxide, hydrate, carbonate, phosphate, fluorite, sulphide, sulphate, sulphite, oxychloride, or a mixture thereof, of the metals indicated above. According to a preferred embodiment the particles C are made from bismuth or bismuth (III) oxide.

Other examples of particles C include alkaline or alkaline earth metals as well as salts thereof, such as carbonates. Preferred examples include carbonates of calcium, strontium, barium, lithium, potassium or sodium.

The metal or semi-metal or compound thereof as Particles C is present in the composite in the range of up to 0.8%, such as 0.05-0.6%, or more preferably 0.1-0.5%, or most preferably 0.15-0.4% by weight of the composition.

The particles C adhere to, or are incorporated in, at least one of the outermost layer of the particles A and/or B, i.e to or in layer A2 and/or B2. In one embodiment, only the outermost layer of the particles A contain the particles C, incorporated into or adhered thereto. In another embodiment, both particles A and B contain the particles C, incorporated into or adhered thereto.

The particles C are made from a metal or semi-metal, including for instance boron. This includes also compounds (such as salts) of the respective metal or semi-metal, as well as alloys of the metal or semi-metal.

In contrast to many used and proposed methods, in which low core losses are desired, it is an especial advantage of the present invention that it is not necessary to use any organic binding agent in the powder composition, which powder composition is later compacted in the compaction step. Heat treatment of the green compact can therefore be performed at higher temperature without the risk that any organic binding agent decomposes; a higher heat treatment temperature will also improve the flux density and decrease core losses. The absence of organic material in the final, heat treated core also allows the core to be used in environments with elevated temperatures without risking decreased strength due to softening and decomposition of an organic binder, and improved temperature stability is thus achieved.

Nonetheless, in one or more of the embodiment mentioned above, a particulate lubricant may be added to the composition. The particulate lubricant may facilitate compaction without the need of applying die wall lubrication.

The particulate lubricant may be selected from the group consisting of primary and secondary fatty acid amides, trans-amides (bisamides) or fatty acid alcohols. The lubricating moiety of the particulate lubricant may be a saturated or unsaturated chain containing between 12-22 carbon atoms. The particulate lubricant may preferably be selected from stearamide, erucamide, stearyl-erucamide, erucyl-stearamide, behenyl alcohol, erucyl alcohol, ethylene-bis-stearamide (i.e. EBS or amide wax). A preferred lubricant is a particulate composite lubricant, comprising a core containing 10-60% by weight of at least one primary fatty acid amide having more than 18 and not more than 24 carbon atoms and 40-90% by weight of at least one bis-amide, said lubricant particles also comprising nanoparticles of at least one metal oxide adhered to the core. Examples of such particulate composite lubricants are disclosed in WO2010/062250, incorporated hereby by reference in its entirety, and the lubricants disclosed in this document are in one embodiment used in the present invention. Preferred lubricants of this document are also preferred lubricants in the present invention.

The particulate lubricant may be present in an amount of 0.1-0.6%, or 0.2-0.4%, or 0.3-0.5%, or 0.2-0.6% by weight of the composition.

Preparation Process of the Composition

The process for the preparation of the composition according to the invention comprises: coating soft magnetic iron-based core particles and Fe—Si particles, each preferably produced and treated to obtain an apparent density of 3.2-3.7 g/ml, with a phosphorous-based compound to obtain a phosphorous-based insulating layer A1 and B1, leaving the surface of the core particles A and B being electrically insulated. The coatings A1 and B1 may be formed on a mixture of the iron-based core particles and the Fe—Si core particles, or may be formed separately on the core particles.

The coated core particles A having the layer A1, and optionally the particles B having the layer B1, are then a) mixed with a compound of Formula (I), or a reaction product thereof, and Particle C having a Mohs hardness of less than 3.5 as disclosed above, to form a coating layer A2 and optionally B2. If a mixture of the particles A having the layer A1 and the particles B having the layer B1 is used, the layers A2 and B2 will form on the respective particles. If it is desired to form the layer from the compound of Formula (I) on only the particles A having the layer A1, the formation of the layer A2 is effected prior to mixing of the particles. Providing the layers A2 and B2 separately prior to mixing is of course also possible, and in this way coating layers A2 and B2 with different compositions can be formed.

The process optionally further comprises mixing the obtained particles, or their mixture, with a lubricant as defined above.

Process for Producing Soft-Magnetic Components

The process for the preparation of soft magnetic composite materials according to the invention comprise: uniaxially compacting the composition according to the invention in a die at a compaction pressure of at least about 600 MPa, preferably above 1000 MPa but not above 1200 MPa; optionally pre-heating the die to a temperature below the melting temperature of the optionally added lubricant; optionally pre-heating the powder to between 25-100° C. before compaction; ejecting the obtained green body; and optionally heat-treating the body. Herein, the peak temperature should be 800° C. or less in order to avoid a decomposition or impairment of the particle coating layers, and is preferably 750° C. or less.

The heat-treatment process may be in vacuum, a non-reducing, inert atmosphere (such as nitrogen or argon), or in weakly oxidizing atmospheres, e.g. 0.01 to 3 Vol. % oxygen. Optionally the heat treatment is performed in an inert atmosphere and thereafter exposed quickly in an oxidizing atmosphere. The temperature may be up to 800° C., but is preferably 750° C. or less, or even 700° C. or less.

The heat treatment conditions shall allow the lubricant, if used, to be evaporated as completely as possible. This is normally obtained during the first part of the heat treatment cycle, above about 150-500° C., preferably above about 250 to 500° C. At higher temperatures, the compound C (metallic or semi-metallic component) may react with the compound of Formula (I) and partly form a network. This may further enhance the mechanical strength, as well as the electrical resistivity of the component. At maximum temperature (which is preferably in the range from 550-750° C., more preferably 600-750° C., still further preferably 630-700° C., such as 630-670° C.), the compact may reach complete stress release at which the coercivity and thus the hysteresis loss of the composite material is minimized.

The compacted and heat treated soft magnetic composite material prepared according to the present invention preferably have a content of phosphorous between 0.01-0.15% by weight of the component, a content of added M (preferably Si) to the base powder between 0.02-0.12% by weight of the component, and if Bi is added as particles C, in form of a metallic or semi-metallic particulate having a Mohs hardness of less than 3.5, the content of Bi may be between 0.05-0.35% by weight of the component.

The obtained magnetic core may be characterized by low total losses in the frequency range 2-100 kHz, normally 5-100 kHz, of about less than 41 W/kg at a frequency of 20 kHz and induction of 0.1 T. Further a resistivity, ρ, more than 2000, preferably more than 4000 and most preferably more than 6000 μΩm, and a saturation magnetic flux density Bs above 1.1, preferably above 1.2 and most preferably above 1.3 T. Further, the coercivity at 10 000 Nm shall be below 240 A/m, preferably below 230 A/m, most preferably below 200 A/m and DC-bias not less than 50% at 4000 A/m.

EXAMPLES

The examples are intended to illustrate particular embodiments and should not be construed as a limitation of the scope of the invention. Unless otherwise stated, the evaluation of magnetic performance and material strength of the components were carried out in the following way:

Samples for magnetic evaluation were compacted into toroids with an inner diameter of 45 mm, an outer diameter of 55 mm, and a height of 5 mm; while TRS bars according SS-EN ISO 3325:2000 were compacted for material strength evaluation. During compaction the the tool die was optionally pre-heated to 80° C. The heat treatment of the compacted components was made in a two step sequence with an initial activation step held at 430° C. for 30 minutes, and a subsequent relaxation step held at 675° C. for 25 minutes. Both steps were carried out in nitrogen with a small amount of oxygen (2500-7500 ppm $O_2$, preferably the amount was 5000 ppm $O_2$).

For Induction, B and coercivity measurements the rings were "wired" with 100 turns for the primary circuit and 100 turns for the secondary circuit enabling measurements of magnetic properties (DC and low frequency core loss measured at 1 T; 50-1000 Hz) with the aid of a hysteresisgraph, Brockhaus MPG 200. For high frequency core loss measurements the rings were "wired" with 100 turns for the primary circuit and 20 turns for the secondary circuit, and then measured with the aid of Laboratorio Elettrofisico Engineering srl, AMH-200 instrument (measured at 0.05, 0.1, and 0.2 T; 2-50 kHz). Green TRS were measured according to SS-EN-23995.

Example 1

A pure water atomized iron powder having a content of iron above 99.5% by weight, and a mean particle size of about 45 μm. The powder was then treated with a phosphorous containing solution according to WO2008/069749. The coating solution was prepared by dissolving 30 ml of 85% weight of phosphoric acid in 1 000 ml of acetone, and then 30 ml-60 ml of acetone solution was used per 1000 gram of powder. After mixing the phosphoric acid solution with the metal powder, the mixture is allowed to dry. Optionally, the powder was mixed a second time with 10 ml-40 ml of acetone solution, and then allowed to dry.

The coated powder was then further mixed by stirring with 0.25% by weight of an aminoalkyl-trialkoxy silane (Dynasylan®Ameo), and thereafter 0.15% by weight of an oligomer of an aminoalkyl/alkyl-alkoxy silane (Dynasylan®1146), both produced by Evonik Ind, to form particles A having a layer A1 and a further layer that is formed by two sub-layers. The composition was further mixed with 0.3% by weight of a fine powder of bismuth (III) oxide as particles C to finally form the layer A2. This treated Powder is called Aa and is an example of Particles A.

Gas atomised Fe—Si (with 6.5 wt % Si) was separately treated with a phosphorous containing solution according to WO2008/069749 to form particles B having the layer B1. The coating solution was prepared by dissolving 30 ml of 85% weight of phosphoric acid in 1 000 ml of acetone, and then 10 ml-40 ml of the acetone solution was used per 1000 gram of powder. After mixing the phosphoric acid solution with the metal powder, the mixture is allowed to dry. The powder was mixed a second time with 10 ml-40 ml of the acetone solution, and then allowed to dry. This powder is called Ba and is an example of Powder B.

The two powders containing particles Aa and Ba were then used as Samples 1, 2, and 3. Here Sample 1 is 100% Aa, sample 2 is only 100% Ba and Sample 3 is a mixture of 70 wt % Aa and 30 wt % Ba. Each of the samples 1, 2 and 3 was mixed with a particulate lubricant, Lubr1 (an amide wax), before compaction. The amount of the lubricant used was 0.4% by weight of the composition.

Example 2

All samples from Example 1 were compacted at 1000 MPa with the tool die pre-heated to 80° C., and the compacts were then heat treatment as described above.

TABLE 1

| Sample | Green TRS [Mpa] | B @ 10 kA/m [T] | Hc @ 10 kA/m [A/m] | Core loss@0.1 T and 10 kHz [W/kg] |
|---|---|---|---|---|
| 1 | 10 | 1.35 | 196.0 | 18.5 |
| 2 | 2 | unprocessable | unprocessable | unprocessable |
| 3 | 7 | 1.29 | 169.0 | 16.3 |

As observed in Table 1, a mixture of particles A and B has lower coercivity and thus gives a low loss. Sample 3 has a resistivity of >10000; μmax 210; B@10 kA/m (1.33 T); Core Loss@1 T 100 Hz (8.5 W/kg); Core Loss@0.1 T 10 kHz (16 W/kg); and Core Loss@0.1 T 20 kHz (33 W/kg). However, pure gas atomised Fe—Si powder (sample 2) cannot be compacted at such low compaction pressure. Mechanical strength of Sample 2 is too weak, when the sample is ejected from compaction tool (die) it will be broken.

As observed in FIG. 2, the DC-bias of the material as measured at 4000 A/m and 50 kHz is improved by 10% by the addition of 30 wt % Ba to Aa.

Example 3—Increase Green Strength

Powders containing coated particles Aa and Ba, obtained as described in Example 1, were mixed in the range 10-50 wt % of Ba in Aa. Each of these mixtures were then mixed with a particulate lubricant, Lub A (an amide wax) or Lub B (a composite lubricant in accordance with WO 2010/062250), before compaction. The amount of the lubricant used was 0.4% by weight of the composition.

Each composition were then compacted at 1000 and 1200 MPa with die temperatures of 60, 80° C., and room temperature for the mixtures containing Lub A; and die temperatures of 60, 80, and 100° C. for the mixtures containing Lub B. The compacted components were then heat treated and evaluated as described above.

As observed in FIGS. 3 and 4, the addition of Lubr2 significantly improves the green strength of the compacted components. The mechanical strengths obtained using Lubr1 as lubricant will enable processing of materials with as high as 50 wt % Ba at moderate compaction pressures (1000-1200 MPa

Example 4—Optimum Amount of FeSi in the Mixture

Powders containing coated particles A and B, obtained as described in Example 1, mixed in the range 10-50 wt % of Ba in Aa. Each of these mixtures were then mixed with a particulate lubricant, Lub A or Lub B, before compaction. The amount of the lubricant used was 0.4% by weight of the composition.

Each composition were then compacted at 800, 1000, and 1200 MPa with a die temperature of 80° C. The compacted components were then heat treated and evaluated as described above.

As observed in FIG. 5, the addition of Ba to Aa initially improves the core losses, especially at low frequencies. However, it is clear that an optimum composition exists around 40 wt % Ba added. For higher amounts of Ba added, the decrease in core loss is almost completely lost, as compared to pure Aa.

Example 5

This example shows the benefit of using Gas atomised Fe—Si compared to equivalent Water atomised Fe—Si powder.

Similar Fe—Si powder as in Example 1, with the only difference that the powder was produced by water atomisation, was treated according to the process described in Example 1. This powder was denoted Ca.

Sample 4 was produced by mixing 70% Aa and 30% Ca. Sample 4 was further mixed with 0.4% of Lubr1 before compaction.

Compaction, heat treatment and testing of obtained sample was performed according to Example 2.

The following table 2 shows the result from testing of sample 4 compared to results obtained for sample 1.

TABLE 2

| Sample | Green TRS [Mpa] | B @ 10 kA/m [T] | Hc @ 10 kA/m [A/m] | Core loss@0.1 T and 10 kHz [W/kg] |
|---|---|---|---|---|
| 3 | 7 | 1.29 | 169.0 | 16.3 |
| 4 | 9 | 1.30 | 195.0 | 18.8 |

Table 2 shows that some improvement of green strength was recorded for sample 4, compared to sample 3. However, coercivity @ 10 kA/m and core loss @0.1 T and 10 kHz, were deteriorated.

The invention claimed is:

1. A composition comprising particles A and particles B, each of the particles A and B comprising a core, the core of the particles A being a soft magnetic iron based core, and the core of the particles B being formed from an Fe—Si alloy, wherein an amount of a total of the particles A and B relative to a total weight of the composition is 85% by weight or more, wherein the core of the particles B consists of Fe, Si, and less than 2% of other elements, wherein the surface of each core of the particles A and B is coated with a phosphorus-containing insulating layer A1 and B1, respectively, and wherein the particles A having the insulating coating layer A1 are provided with a further layer A2 on top of the layer A1, the layer A2 being formed from a compound of formula (I), or a reaction product of formula (I):

$$M(OR_1)_x(R_2)_y \qquad \text{Formula (I)}$$

wherein M is selected from Si, Ti, Al, or Zr;

$R_1$ is a straight or branched alkyl group having 4 or less carbon atoms;

$R_2$ is an organic group optionally containing a functional group, and x+y are integers denoting the number of groups $OR_1$ and $R_2$, respectively, and if M is Si, Zr or Ti, x is chosen from 1, 2 and 3, and y is chosen from 1, 2 and 3, with the proviso that (x+y)=4; and if M is Al, then x is chosen from 1 and 2, and y is chosen from 1 and 2, with the proviso that (x+y)=3;

wherein the reaction product is a product obtained by a reaction of one molecule of a compound of formula (I) with one or more molecules of a compound of formula (I) and/or with the layer A1; and wherein the particles A further comprise particles C that are adhered to the layer A2 or which are incorporated into the layer A2, the particles C being particles of a material having Mohs hardness of 3.5 or less.

2. The composition according to claim 1, wherein the particles B are provided with a layer B2 on the layer B1, the layer B2 being formed from a compound of formula (I), or a reaction product of formula (I):

$$M(OR_1)_x(R_2)_y \qquad \text{Formula (I)}$$

wherein M is selected from Si, Ti, Al, or Zr;

$R_1$ is a straight or branched alkyl group having 4 or less carbon atoms;

$R_2$ is an organic group optionally containing a functional group, and x+y are integers denoting the number of groups $OR_1$ and $R_2$, respectively, and if M is Si, Zr or Ti, x is chosen from 1, 2 and 3, and y is chosen from 1, 2 and 3, with the proviso that (x+y)=4; and if M is Al, then x is chosen from 1 and 2, and y is chosen from 1 and 2, with the proviso that (x+y)=3, and wherein optionally the particles B contain particles C that are adhered to or incorporated into the layer B2.

3. The composition according to claim 1, wherein said powder composition further comprises a lubricant.

4. The composition according to claim 1, wherein the layer A2 and/or B2 is formed from a compound of formula (I), or wherein the layer A2 and/or B2 is formed from a reaction product of a compound of formula (I), wherein the number of metal atoms M in one molecule is from 2-20.

5. The composition according to claim 1, wherein $R_2$ includes one or more of the following functional groups: amine, diamine, amide, imide, epoxy, mercapto, disulfido, chloroalkyl, hydroxyl, ethylene oxide, ureido, urethane, isocyanato, acrylate, glyceryl acrylate, carboxyl, carbonyl, and aldehyde.

6. The composition according to claim 1, wherein the compound of formula (I) or a reaction product thereof is an oligomer of the compound of formula (I), and wherein the oligomer is selected from alkoxy-terminated amino-silsesquioxanes, amino-siloxanes, oligomeric 3-aminopropyl-alkoxy-silane, 3-aminopropyl/propyl-alkoxy-silane, N-aminoethyl-3-aminopropyl-alkoxy-silane, or N-aminoethyl-3-aminopropyl/methyl-alkoxy-silane, or mixtures thereof.

7. The composition according to claim 1, wherein the particles C include bismuth or bismuth (III) oxide.

8. The composition according to claim 1, wherein the weight ratio of particles A and B (A:B) is from 95:5 to 50:50.

9. The composition according to claim 1, wherein the core particles of the particles A have an apparent density of 3.3-3.7 g/mL.

10. The composition according to claim 1, wherein layer A2 comprises a compound of formula (I), a dimer, and/or an oligomer thereof.

11. The composition according to claim 1, wherein the reaction product is a polycondensate of two or more compounds of Formula (I) wherein the compounds may be the same or different from each other.

12. A method for producing a compacted and heat-treated component, comprising the steps of a) providing a composition as defined in claim 1, b) compacting the composition, optionally mixed with a lubricant, in a uniaxial press movement in a die, c) ejecting the compacted component from the die, and d) optionally heat-treating the ejected component in a non-reducing atmosphere at a temperature of up to 800° C.

13. Component, obtainable by compacting a composition as defined in claim 1.

14. Component according to claim 13, which is an inductor core.

15. Inductor core according to claim 14, having a resistivity ρ of 3,000 μΩm or higher; a saturation magnetic flux density Bs of 1.1 T or higher; a core loss of 21 W/kg or less at a frequency of 10 kHz and an induction of 0.1 T; a coercivity at 10 000 A/m of 240 A/m or less; and a DC-bias of not less than 50% at 4 000 A/m.

* * * * *